United States Patent

Cech

[15] 3,639,181
[45] Feb. 1, 1972

[54] SINTERED COBALT-RARE EARTH BODIES AND METHOD OF PRODUCTION

[72] Inventor: Robert E. Cech, Scotia, N.Y.
[73] Assignee: General Electric Company
[22] Filed: May 27, 1970
[21] Appl. No.: 41,090

[52] U.S. Cl.....................148/100, 29/182, 75/200, 75/201, 75/208, 75/224, 148/31.57, 148/101, 148/103
[51] Int. Cl............................................H01f 1/08
[58] Field of Search..................75/200, 201, 208, 224; 148/100, 101, 102, 103, 31.57; 29/182.1

[56] References Cited

UNITED STATES PATENTS

| | | | |
|---|---|---|---|
| 3,424,578 | 1/1969 | Strnat et al. | 75/200 X |
| 3,440,043 | 4/1969 | Zdanuk et al. | 29/182.1 X |
| 3,505,065 | 4/1970 | Gwyne, Jr. | 29/182.1 X |
| 3,560,200 | 2/1971 | Nesbitt et al. | 148/31.57 X |

*Primary Examiner*—L. Dewayne Rutledge
*Assistant Examiner*—G. K. White
*Attorney*—Richard R. Brainard, Paul A. Frank, Charles T. Watts, Frank L. Neuhauser, Oscar B. Waddell and Joseph B. Forman

[57] ABSTRACT

By infiltrating liquid calcium metal into a green compact of single-phase $Co_5R$ powder of high-coercive force during the early stages of a sintering operation, the coercive force of the powder particles of the compact are preserved or increased and a new sintered product having high-coercive force and high-magnetic saturation is obtained.

13 Claims, No Drawings

SINTERED COBALT-RARE EARTH BODIES AND METHOD OF PRODUCTION

The present invention relates generally to the permanent magnet art and is more particularly concerned with novel sintered cobalt-rare earth intermetallic bodies having high coercive force and high magnetic saturation properties, and with a new method of making these bodies.

Cobalt-rare earth intermetallic compounds of the type $Co_5R$ (R designates a rare-earth metal or yttrium in each occurrence) possess remarkable properties of high magnetic coercive force and saturation magnetization, and they exist in a variety of phases but exhibit their best magnetic properties in a single-phase form. In powder form, single-phase $Co_5R$ compounds possess generally very good properties, but unfortunately they cannot be used in that form because of instability in air and resulting rapid deterioration of their magnetic characteristics. Neither has it been possible heretofore to retain the superior magnetic properties of $Co_5R$ powders through processing into consolidated bodies which are not subject to such rapid deterioration. Efforts in this direction have included the formation of green bodies or compacts which are sintered with or without infiltrating liquid metal to increase final density.

Now, for the first time to my knowledge, it is possible through the use of the present invention to retain and even enhance the magnetic properties of $Co_5R$ powders as they are consolidated into sintered bodies. This result is enabled by my several unexpected discoveries upon which the novel method and the new articles of my invention are predicated. Moreover, no substantial offsetting disadvantage is incurred in obtaining this new result.

One of these important discoveries of mine is that if calcium metal is employed as an infiltrating material so that it melts and enters the pores and voids of the green compact during the early stages of sintering, the superior magnetic properties of the $Co_5R$ powder material can be retained.

Another of my important discoveries is that the high coercive force of such material under certain critical circumstances can actually be significantly increased during processing to final sintered body form.

Still another discovery that I have made is that the useful life of a sintered $Co_5R$ body can be greatly prolonged, the desired magnetic properties being stabilized by providing a thin metallic coating over the entire surface of the freshly prepared sintered body.

Still another of my discoveries is that certain materials other than calcium itself can be employed to obtain the foregoing results and advantages, and even in some cases to make unnecessary the protective coating of the ultimate sintered body. Thus, as equivalents or alternatives to calcium, I have found that thorium, calcium-copper alloy and calcium rare-earth intermetallic compounds or alloys may be employed as the infiltrating protective material. Calcium hydride and thorium hydride as sources of calcium metal and thorium metal at elevated temperatures or during early stages of sintering may likewise be used with the same ultimate advantages.

An additional discovery of mine is that while this process is applicable with the foregoing advantages to $Co_5Sm$ compositions containing from 34.8 to 36.5 percent samarium when calcium, for example, is employed as the infiltrating material, this range can be extended downward to about 31.2 percent samarium if the infiltrating agent includes samarium in form such that it will react with the cobalt-samarium of the green compact to produce $Co_5Sm$ compounds of from 34.8 to 36.5 percent samarium.

I have additionally discovered that an amount of infiltrant substantially less than that required to completely fill the void volume of the green compact $Cp_5R$ body is effective to preserve or enhance the magnetic characteristics of the original $Co_5R$ single-phase material of the green compact. Thus, an amount approximating one-quarter to one-third of that necessary to fill the void volume will be sufficient to provide the coating effects which I believe to be essential to the protection of the magnetic properties through the sintering operation.

Finally, I have found that even if the void volume is substantially filled with liquid calcium during sintering, a high degree of densification beyond that prevailing at this stage can be realized by evaporating the calcium from the sintered body under sintering conditions which then results in the filling partially or substantially of the void volume with $Co_5R$ single-phase material itself.

Briefly and generally described, the new method of this invention based upon the foregoing discoveries comprises the steps of pressing cobalt-rare earth intermetallic material in single-phase powder form and thus forming a green compact, and then heating the green compact in contact with liquid metallic substance, such as calcium, under a protective atmosphere to sinter the green compact to final density. More specifically, the pressing operation may involve either closed die pressing or hydrostatic pressing or a compaction operation such as extrusion, and the cobalt-rare earth material may be any cobalt-rare earth or cobalt-yttrium compound which has properties of magnetic saturation and coercive force which are desirable in the final sintered body product. Also, the firing temperature will be in the range from about 950° C. to about 1,200° C., depending upon the particular material used as infiltrating material and the rare-earth content of $Co_5R$. The atmosphere will be one which is nonreactive in a detrimental way with the $Co_5R$ single phase during the sintering operation; and the infiltrating material may be other than calcium itself, such as calcium hydride, calcium-copper alloy, calcium-rare earth alloy, or it may be of thorium or thorium hydride.

In the preferred practice of this invention, $Co_5Sm$ powder of size averaging less than 44 microns, preferably 5 to 10 microns with the largest being not over 20 microns in greatest dimension, is employed as the magnetic material and the pressing is carried out in a closed die pressing, hydropressing or isostatic pressing operation to produce a body of the desired size or shape. Then in the next stage involving the preliminary heating and final sintering, the resulting green compact is placed in a heating chamber with a piece of calcium metal in contact with the compact so that as the calcium melts, it flows by capillary action into the pores of the compact, more or less uniformly filling the void volume thereof to the extent of 30 to 40 percent of that volume, the internal surfaces defining the void volume thus being substantially entirely wet or coated by liquid calcium. During this stage and into the final stages of the sintering step, calcium reacts with oxygen in the system (calcium oxide being the thermodynamically stable species) with the result that the $Co_5Sm$ is effectively protected against oxygen attack.

As indicated above, it is my preference to produce sintered bodies of maximum density approaching that of theoretical, i.e., about 95 percent, although satisfactory sintered magnet products can be made in accordance with this invention with densities as low as 70 percent. In the production of the lower density sintered bodies, the pressures applied in producing the green compacts may be of the order of 20,000 p.s.i. and the sintering operation may be terminated as soon as the $Co_5R$ single phase has been sintered throughout to provide a structure having the requisite physical properties. The higher density bodies, which are preferred, are produced either by prolonging the sintering operation to allow for coalescence of the particles within the body, thereby closing and substantially filling the voids after the infiltrant has been largely expelled, or are produced by a combination of prolonged sintering with a preliminary high-pressure green compact-forming step involving the use of high pressures of the order of 100,000 p.s.i. or greater.

In its article aspect, the present invention product in general is a sintered cobalt-rare earth body of average grain size less than about 44 microns and density at least 70 percent of theoretical. This body comprises a major proportion of single-phase $Co_5R$ intermetallic compound and a minor proportion of a substance such as calcium distributed in segregated form through the body along the grain boundaries of the matrix material. Preferably, the minor proportion substance consists of calcium and calcium oxide formed as a result of reaction during the high-temperature processing stage of oxygen and infiltrating metal. As also indicated above, when calcium is used as the infiltrating substance, the sintered body product will preferably be provided with a thin coating of the order of a few microns thickness of a protective metal film to prevent attack by moisture and oxygen of the air on the calcium oxide and calcium in the grain boundaries and within the voids of the sintered article. This coating will preferably be either of copper, suitably provided by an electroplating operation, or of zinc which may be vapor-deposited. Protective coatings of other metals or of nonmetallic materials which do not significantly impair or reduce the magnetic properties or limit the utility of these new sintered products, are also contemplated for use in the method of this invention.

The following illustrative, but not limiting, examples are offered as a further description of the present invention and the best mode of practicing it:

EXAMPLE I

Stoichiometric $Co_5Sm$ powder of particle size less than 325 mesh was pressed in an aligning magnetic field of 18 kOe (kilo-oersteds) at 120,000 p.s.i. to produce a 2.5-gram disc specimen. The specimen was placed in a 1-mil iron foil envelope providing a limited atmosphere exchange chamber, in contact with a 0.1-gram piece of calcium. An additional 0.01 gram of calcium was placed in the envelope for reaction with any oxygen which might effuse into the chamber during the sintering stage. The envelope with its contents was then placed in a molybdenum boat and transferred to the hot zone of a helium-atmosphere furnace where it was subjected for 5 minutes to a temperature of 1,100° C. After furnace cooling, the resulting sintered body was removed from the chamber and magnetized at 43 kilo-oersteds. Its open circuit field strength was 4,500 gauss measured in a cylindrical specimen with a length to diameter ratio of 0.99 (load line slope = 2.4) and its intrinsic coercive force was 27,000 oersteds. The density of the "green" die-pressed body was 70 percent but this was increased to 80.6 percent in the sintered body. These properties were again measured after the specimen had remained in air for 2 days with the following result: Open circuit field strength, 4,500 gauss, coercive force 27,000 oersteds. At that time, however, the specimen exhibited a tendency to crumble, apparently because of hydration of the calcium oxide in the grain boundaries and possibly also because of oxidation of calcium metal within the sintered body.

EXAMPLE II

Another specimen was prepared by closed-die pressing a blended mixture of $Co_5Sm$ powders analyzing 35.0 percent samarium, 65.0 percent cobalt. A pressing force of 100,000 p.s.i. and an aligning magnetic field of 18 kilo-oersteds was applied to form a green body having a pressed density of 70 percent that of fully dense material. A small piece of calcium metal sufficient to fill the void space was placed in contact with the green body inside a molybdenum foil ampul, which then was placed in an iron foil envelope. The assembly was heat-treated for 90 minutes at 1,160° C. in a helium-atmosphere (at about atmospheric pressure) furnace with a slight temperature gradient. The specimen was located at the highest temperature in the gradient region. After completion of the sintering treatment, the specimen was furnace-cooled to room temperature and its density was measured and found to be 86 percent of theoretical. It was then copper plated, and next heattreated for 10 minutes at 400° C. in vacuum, and magnetized at 43 kilo-oersteds for magnetic measurements. The specimen was found to have an intrinsic coercive force of 14.5 kilo-oersteds and an open circuit flux of 4,120 gauss, (load line slope = 1.2). The specimen was next aged in air for 192 hours at 110° C. and remeasured. The intrinsic coercive force was still 14.5 kilo-oersteds and the open circuit flux was 4,120 gauss.

As indicated above, the rare earth alloys and intermetallic compounds useful in accordance with this invention are the 15 elements of the Lanthanide Series having atomic numbers 57 to 71, inclusive. The element yttrium (atomic number 39) is commonly included in this group of metals and, for purposes of this invention and this specification, is considered a rare-earth metal.

Representative of the cobalt-rare earth alloys and intermetallic compounds contemplated for use in the process of this invention are cobalt-cerium, cobalt-praseodymium, cobalt-neodymium, cobalt-samarium, cobalt-europium, cobalt-gadolinium, cobalt-terbium, cobalt-dysprosium, cobalt-holmium, cobalt-erbium, cobalt-thulium, cobalt-ytterbium, cobalt-lutetium, cobalt-yttrium, cobalt-lanthanum and cobalt-misch metal. Misch metal is presently the most common alloy of rare-earth metals and it contains metals in the approximate ratio in which they occur in their most common occurring natural ores.

As also previously indicated herein, it is contemplated by the present invention that cobalt-rare earth alloys or intermetallic compounds in powder form can be processed in accordance with the present discoveries with calcium-rare earth compounds of different rare-earth metals. Thus, for example, calcium-lanthanum of any desirable lanthanum content may be used in the processing of $Co_5Sm$ powder to produce the ultimate novel sintered product of this invention. In this case, the surface portions of the sintered body product would be ternary alloy or intermetallic compound of cobalt-samarium-lanthanum. The new advantages and results of the present invention may accordingly be obtained without matching the calcium-rare earth compounds with the corresponding cobalt-rare earth compounds. It is even contemplated that mixtures of calcium-rare earth compounds, such as calcium-lanthanum and calcium-cerium, will be employed for the purposes of this invention where, for instance, the intermetallic compound or powder is $Co_5Sm$.

Wherever in this specification proportions or percentages are stated, reference is to the weight basis unless otherwise expressly stated.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, part of the specifically described embodiments of the invention may be made without departing from the scope of the invention as set forth in what is claimed.

What I claim as new and desire to secure by Letters Patent of the United States is:

1. The method of making a high-density sintered body from cobalt-rare earth intermetallic material in powder form while retaining the high coercive force and high magnetic saturation properties of the powder which comprises the steps of pressing powder of the said material which at sintering temperature will exist as a single intermetallic phase and thereby forming a green compact, and heating the green compact in contact with a liquid metallic substance selected from the group consisting of calcium, thorium, calcium-copper alloy, and calcium-rare earth intermetallic compound or alloy in a protective atmosphere and at a temperature from about 950° C. to about 1,200° C. and thereby sintering the cobalt-rare earth intermetallic green compact to final density.

2. The method of claim 1 in which the intermetallic material in powder form is $Co_5Sm$.

3. The method of claim 1 in which the liquid metallic substance is calcium.

4. The method of claim 1 in which the liquid metallic substance is calcium-samarium intermetallic compound or alloy.

5. The method of making a sintered cobalt-rare earth intermetallic body form cobalt-rare earth intermetallic material in powder form while retaining the high coercive force and magnetic saturation characteristics of the powder which comprises the steps of forming a green compact of the powder having internal surfaces defining voids, positioning a body of metallic material selected from the group consisting of calcium, thorium, calcium-copper alloy and calcium-rare earth intermetallic compound in contact with the green compact, heating the green compact and juxtaposed metallic body and melting the metallic body and thereby infiltrating the green compact and coating the internal void-defining surfaces of the compact with metal from said metallic body, and sintering the green compact to final density.

6. The method of claim 5 in which the sintering step is carried out at a temperature and for a time sufficient to evaporate substantially all the metallic coating on the internal void-defining surfaces of the compact.

7. The method of claim 5 in which the cobalt-rare earth intermetallic material is $Co_5Sm$ and in which the body of metallic material consists of calcium.

8. The method of claim 5 in which the step of forming the green compact is carried out by pressing the powder in a magnetic field to magnetically align the powder particles.

9. The method of claim 5 in which the body of infiltrating metallic material consists of calcium and in which the calcium is employed in amount at least sufficient to fill one-third of the total void volume of the green compact.

10. The method of claim 5 in which the sintering step is carried out until the void volume is substantially filled with cobalt-rare earth intermetallic material.

11. The method of claim 5 in which calcium is the infiltrating metallic material and in which the resulting sintered intermetallic body is provided with a protective coating of copper or zinc as the final processing step.

12. A sintered cobalt-rare earth body having an average grain size less than about 44 microns, having a density of at least about 70 percent of theoretical and consisting essentially of a major proportion of $Co_5R$ intermetallic phase and a minor proportion of a substance selected from the group consisting of calcium, thorium, calcium oxide, thorium oxide, calcium-copper alloy and calcium-rare earth intermetallic compound or alloy, and mixtures thereof, said minor proportion substance being segregated in the body along the grain boundaries of the $Co_5R$ intermetallic phase.

13. The sintered body of claim 12 in which the major proportion intermetallic phase consists of $Co_5Sm$ and the minor proportion substance consists of calcium and calcium oxide.

* * * * *